Patented Aug. 11, 1936

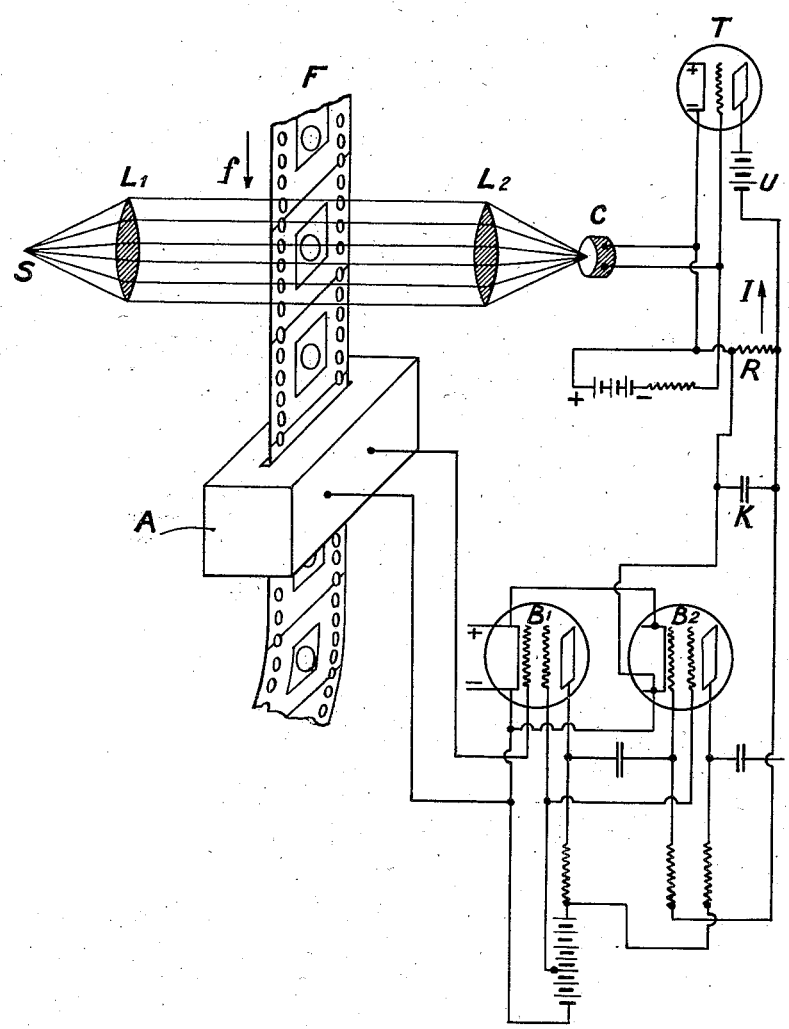

2,050,412

UNITED STATES PATENT OFFICE 2,050,412

TELECINEMATOGRAPHIC EMITTER

René Barthelemy, Fontenay aux Roses, France, assignor to Compagnie pour la Fabrication des Compteurs et Materiel d'Usines a Gaz, Montrouge, France Application June 23, 1933, Serial No. 677,227
In France June 25, 1932

2 Claims. (Cl. 178—6)

As is well known, certain difficulties are experienced in telecinematography when one desires to use films that in the course of their passage in front of the photoelectric cell show various degrees of transparence. Although the dark part of the film, projected on the screen normally may be seen very well by the spectators thanks to the extensive accommodating powers of the eye, the same part, when analyzed by well known methods of television acting on the ensemble of cells and amplifiers having a fixed responsiveness, no longer exercises sufficient action on the receptive organ and the reception becomes difficult and often impossible.

The present invention consists in an automatic control of the sensitiveness of the amplifier at the emitting apparatus by the mean transparence of the images analyzed. In other words, the amplifier becomes more sensitive if the background is dark and the amplification is reduced if the film is very bright. Naturally, one must consider the mean transparence of a picture, or even of part of a film, and not the transparence of some parts of the moving image. One thus reduces, in the proportion necessary, the too extensive differences that may appear in an ordinary film not specifically made for television.

The present invention consists, in its preferred form, of combining a transmitting device, a photo-electric organ sensitive to the mean transparence of a film and furnishing an electric current that is utilized in varying the sensitiveness to responsiveness of the amplifier of the transmitter. The purpose of the photo-electric organ is to send, through a sufficient area of the film near the analyzed portion, i. e., the film portion about to be analyzed, a fixed luminous flux that falls on the photo-sensitive cell; and after amplification by well known methods, one obtains an electrical current the strength of which depends on the light received by the cell, i. e., on the mean transparence of the film. This current passes through an appropriate resistance and produces a difference of potential which is applied, for example, to the control electrodes of the discharge tubes of the electrical amplifier of the emitting apparatus, and thus varies the amplification of said tubes when the transparence of a sufficiently large film surface presents in itself certain variations. This happens during the analysis of the film portion the mean transparency of which has been varied.

A schematic representation is illustrated in the drawing and described herewith as an example to aid in understanding the operation of the device.

The film F is moved in the direction of arrow $f$ and passes through the optical analyzer A, which may be of any type whatsoever furnishing a tension representing the television modulation and one that may be amplified, for example, by screen-grid tubes having screens $B_1$, $B_2$, etc. one of which, $B_2$ may be of the variable bias type. An auxiliary luminous source S gives a sufficiently large beam of light through lens $L_1$. The light subsisting after passage through the film is collected by lens $L_2$ and is concentrated on a photoelectric cell C. This cell is connected with an amplifier triode tube T and causes amplification of the anode current I supplied by source U when the luminous flux received by the cell increases, that is, when the film is very transparent. The current I passes into resistance R and produces a potential difference RI which is introduced into the circuit of the control electrode of the tube with a variable bias grid $B_2$. The negative polarization of this electrode thus increases with the transparence of the film and the amplification is diminished. The magnitude of this correction is easily regulated by the value of resistance R. A condenser K, of sufficient value, avoids the necessity of applying to the control electrode of the amplifier $B_2$ detailed variations that are too rapid and permits one to bring to the normal operation of the amplifier extremely slow mean correctives in connection with the analysis frequency.

What I claim is:—

1. In a telecinematographic transmitting apparatus, a film analyzer, means including said analyzer for producing a modulated current, a first electric current amplifier comprising electrical discharge tubes for amplifying said modulated current, a luminous source, a first optical system for directing across a film surface corresponding to a plurality of lines of analysis before said surface is analyzed light emitted by said source, a photoelectric cell, a second optical system for concentrating towards the cell light passed through the film, a circuit including a source of current and said photoelectric cell, an electrical discharge tube having at least an anode, a cathode and a control electrode, means for connecting said cathode and control electrode to each of the terminals of the photoelectric cell, a resistance in the anode circuit, a capacity in parallel with the resistance, and means for applying to one electrode of said electrical discharge tubes the difference of potential between the terminals of the resistance, whereby the variations in modulation due to variations in the mean transparence of the film are diminished.

2. In a telecinematographic transmitting apparatus, a film analyzer, means including said analyzer for producing a modulated current, a first electric current amplifier comprising electrical discharge tubes for amplifying said modulated current, a luminous source, a first lens for directing across a film surface corresponding to a plurality of lines of analysis before said surface is analyzed light emitted by said source, a photoelectric cell, a second lens for concentrating towards the cell light passed through the film, a circuit including a source of current and said photoelectric cell, an electric discharge tube having at least an anode, a cathode and a control electrode, means for connecting said cathode and control electrode to each of the terminals of the photoelectric cell, a resistance in the anode circuit, a capacitance in parallel with the resistance, and means for applying to one electrode of said electrical discharge tube the difference of potential between the terminals of the resistance, whereby the variations in modulation due to variations in the transparence of the film are diminished.

RENÉ BARTHELEMY.